US010652503B2

(12) United States Patent
Dozier (10) Patent No.: US 10,652,503 B2
(45) Date of Patent: May 12, 2020

(54) CAMERA VIDEO RECORDER

(71) Applicant: Charles W. Dozier, Dallas, TX (US)

(72) Inventor: Charles W. Dozier, Dallas, TX (US)

(*) Notice: Subject to any disclaimer, the term of this patent is extended or adjusted under 35 U.S.C. 154(b) by 262 days.

(21) Appl. No.: 14/249,923

(22) Filed: Apr. 10, 2014

(65) Prior Publication Data

US 2015/0125124 A1 May 7, 2015

Related U.S. Application Data

(60) Provisional application No. 61/898,957, filed on Nov. 1, 2013.

(51) Int. Cl.
*H04N 5/77* (2006.01)
*H04N 7/18* (2006.01)
*H04N 5/765* (2006.01)
*H04N 5/76* (2006.01)

(52) U.S. Cl.
CPC ............. *H04N 5/772* (2013.01); *H04N 5/76* (2013.01); *H04N 5/765* (2013.01); *H04N 7/181* (2013.01)

(58) Field of Classification Search
CPC .................................................... H04N 5/772
USPC ........................................................ 386/358
See application file for complete search history.

(56) References Cited

U.S. PATENT DOCUMENTS

| | | | |
|---|---|---|---|
| 5,801,770 A | 9/1998 | Paff et al. | |
| 7,843,487 B2 * | 11/2010 | Tojima | H04N 5/232 348/159 |
| 8,976,243 B2 | 3/2015 | Marquart | |
| 2003/0011678 A1 | 1/2003 | Chun | |
| 2003/0206106 A1 * | 11/2003 | Deconinck et al. | G08B 13/12 340/568.2 |
| 2005/0193421 A1 | 9/2005 | Cragun | |
| 2006/0056056 A1 | 3/2006 | Ahiska | |
| 2006/0279423 A1 | 12/2006 | Nazari | |
| 2007/0035627 A1 | 2/2007 | Cleary et al. | |
| 2007/0039030 A1 | 2/2007 | Romanowich et al. | |
| 2008/0049116 A1 * | 2/2008 | Tojima | H04N 5/232 348/222.1 |
| 2008/0151056 A1 | 6/2008 | Ahamefula | |
| 2008/0198231 A1 * | 8/2008 | Ozdemir et al. | H04N 7/18 348/159 |
| 2011/0122240 A1 * | 5/2011 | Becker | H04N 5/2251 348/61 |

(Continued)

*Primary Examiner* — Eileen M Adams
*Assistant Examiner* — Daniel T Tekle
(74) *Attorney, Agent, or Firm* — Fogarty LLP (57) ABSTRACT

A camera video recorder may include a housing operatively mounting a digital video camera. A digital video recorder disposed in the housing is linked to the digital video camera and records images provided by the camera. A network switch disposed in the housing provides at least one network connection, and a processor adapted to run an operating system, and control the digital video camera, digital video recorder and network switch is also disposed in the housing. The network ports may be switched, selectively providing pass-through and switched communication. The processor may be adapted to provide an Internet protocol-based interface for accessing the camera video recorder and to provide analytics. A plurality of camera video recorders may be linked in series, and at least one of the camera video recorders may be linked to a network, via network connections provided by the network switch in the camera video recorders.

20 Claims, 3 Drawing Sheets

(56) References Cited

U.S. PATENT DOCUMENTS

| | | |
|---|---|---|
| 2011/0187871 A1 | 8/2011 | Hsieh |
| 2011/0229105 A1 | 9/2011 | Khan et al. |
| 2011/0292207 A1* | 12/2011 | Bae ................. H04N 7/181 |
| | | 348/143 |
| 2012/0063737 A1* | 3/2012 | Gregoire ............ H04N 5/76 |
| | | 386/224 |
| 2012/0092502 A1 | 4/2012 | Knasel et al. |
| 2013/0210563 A1 | 8/2013 | Hollinger |
| 2013/0265422 A1 | 10/2013 | Ho et al. |
| 2013/0342693 A1* | 12/2013 | Lee .................. H04N 7/18 |
| | | 348/143 |
| 2015/0055929 A1 | 2/2015 | Van Hoff |
| 2015/0138365 A1 | 5/2015 | Hsieh et al. |

* cited by examiner

CAMERA VIDEO RECORDER

CROSS-REFERENCE TO RELATED APPLICATIONS

This application claims the benefit of the filing date of U.S. Provisional Patent Application No. 61/898,957 which is titled "Camera Video Recorder" and was filed Nov. 1, 2013, the disclosure of which is hereby incorporated by reference herein in its entirety.

TECHNICAL FIELD

Embodiments of the invention are directed, in general, to video security systems and, more specifically, to a self-contained surveillance unit that can provide an Internet protocol interface and/or be directly linked to other units and/or a network.

BACKGROUND

Archival video systems are used in many different applications to provide a historical video record. Some applications include security systems, surveillance and machine control. Early implementations of archival video systems stored video using video cassette recorders (VCRs). While such systems are still used, many applications have migrated to storing digitized video on hard disk drives or Solid State Drives (SSDs) of the types used in computer applications. The drives may be local (i.e., on the same premises as the camera) or remote. The data for remote storage can be transmitted over telephone lines, over the Internet, through other networking means, or in similar fashion. Many existing systems employ Digital Video Recorders (DVRs) or the like, which may employ hard drives and/or SSDs to store video images. Such DVRs have been incorporated into cameras in attempts to provide more integrated security camera solutions. Internet protocol security cameras may provide an Internet protocol interface through a network connection. However, such cameras typically must each be connected to a network switch, which in turn is connected to a network. Thus, typical installations of IP security cameras require not only a separate network switch, but each camera also requires its own "home run" of network cabling.

SUMMARY

The present invention is directed to systems and methods, which provide a Camera Video Recorder (CVR). Embodiments of such a CVR have a camera housing and a digital video camera operatively mounted in the housing. This digital video camera may be an Internet protocol camera in various embodiments. A digital video recorder is disposed in the housing and linked to the digital video camera to record images provided by the digital video camera. A network switch is disposed in the housing and provides at least one (switched) network connection, which may be a plurality of switched network ports, such as a plurality of switched network ports that selectively provide switched and/or pass-through communication. A processor is adapted to run an operating system and control the digital video camera, digital video recorder and network switch. In various embodiments, the processor is adapted to provide an Internet protocol-based interface, such as an HTML interface, for accessing the CVR. Also, the processor may run the operating system and controls the digital video camera, digital video recorder and network switch to provide analytics, such as, by way of example, through the camera lens environmental light monitoring. Embodiments of the present CVR may also include an input-output interface, such as a universal serial bus interface. Various embodiments may further include a memory card interface in operative communication with the digital video recorder for storing or transferring digital video to a memory card operatively disposed in the memory card interface.

Thus, process or method implementations in accordance with the present invention may operatively couple a digital video camera, a digital video recorder, a network switch and a processor, within a CVR housing. Such implementations may run an operating system and control the digital video camera, digital video recorder and network switch, using the processor, such as to provide an Internet protocol-based interface via the network switch, by way of example. Such an Internet protocol-based interface may be an HTML interface, in certain implementations. Regardless, an interface to control operation of the CVR, download images from the digital video recorder, setup the CVR, and or the like, may be provided in various implementations. Some implementations of such processes or methods may further include linking a plurality of the CVRs in series via network connection provided by the network switch in each CVR and linking at least one of the CVRs to a network via a network connection provided by the network switch in the CVR(s). In such implementations, the network switches may selectively provide switched and/or pass-through communication between the CVRs and/or between one of the CVRs and the network. Regardless, in various implementations of the present processes or methods the processor may run the operating system and/or control the digital video camera, digital video recorder and network switch to provide analytics.

Surveillance system embodiments in accordance with the present invention may include a plurality of CVRs. Each CVR may include a camera housing and a digital video camera operatively mounted in the housing. A digital video recorder may be disposed in the housing, coupled to the digital video camera and recording images provided by the digital video camera. A network switch disposed in the housing may provide a plurality of network connections, and a processor disposed in the housing may be adapted to run an operating system and to control the digital video camera, digital video recorder and network switch to provide an Internet protocol-based interface. In such surveillance system embodiments network links link each CVR to another CVR, in series, via the network connections, and link at least one of the CVRs to a network via one of the network connections. In such surveillance system embodiments, the plurality of network connections may be switched network ports that selectively provide switched or pass-through communication between CVRs, or between one or more of the of CVRs and the network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In accordance with various embodiments, a Camera Video Recorder (CVR) provides a complete surveillance solution containing all elements of a typical video surveillance system engineered into a compact camera housing. The housing includes, for example, a digital camera, digital video recorder, and analytics. The digital camera may be an Internet Protocol (IP) camera employing an analog-to-digital converter within each pixel of the image sensor, such as Pixim Inc.'s Digital Pixel System® technology. Embodiments of the present CVR may incorporate a digital media processor, such as a processor employing DaVinci™ technology from Texas Instruments®. Embodiment CVR circuitry combines multiple video and computer system functions in one multi-processor controller. Images and video captured by the CVR may be stored in any format, such as JPEG, MPEG, or H.264, and at any appropriate rate and resolution. A built-in network switch allows installation of the present CVR onto an existing network, without additional hardware. Hence, various CVR embodiments may be installed at any practical location for surveillance recording, without requiring additional network hardware, such as a separate network switch.

Various embodiments of the present CVR provide a web-accessible interface designed to be intuitive, so that initial programming can be done quickly. In accordance with such embodiments, settings may be transferred to other CVR systems via flash-drive or network IP. When needed, live, surveillance, and/or transaction images may be retrieved using a web-enabled mobile device or via an HTML web interface.

Placement of various CVR embodiments can provide protection not only from robbery or the like, but also from employee-customer disputes, slip and fall claims and asset disappearance. In an Automated Teller Machine (ATM) installation, embodiments of the CVR may be used monitor transactions and locations, employing high quality video images. Embodiments may help protect against account fraud, such as through integration of the CVR with an on-line teller system. Check fraud and the like can be addressed by the present systems through capture and storage of high quality transaction and surveillance (video) images.

As discussed in greater detail below, in various embodiments, features of the CVR may include a full-featured digital video recorder; motion, surveillance, and transaction recording; quick and easy setup and programming; an ability to daisy-chain multiple CVRs; IP/TCP and mobile device interfacing; a built-in 2 port switch; and multiple user-levels. Embodiments of the present CVR may provide for configuration in a number of different network set ups, such as: a basic install, where the CVR is externally powered and images are stored locally on a memory card; a File Transfer Protocol (FTP) to server install on alarm input, where images are uploaded to server via an FTP connection; various multiple CVR setups, using the CVRs' built-in network switches, such that multiple CVRs are connected to each other, wherein images may be stored locally on the CVRs' memory cards; and ATM installations, wherein the CVR easily integrates with an ATM using its built-in network switch, monitoring transactions, and storing images locally on its memory card. Images are easily retrieved using a HTML interface or via smartphone in various embodiments. All of these features make the present CVR embodiments well suited for stand-alone use, or as part of an enterprise-wide installation.

Figure 1:
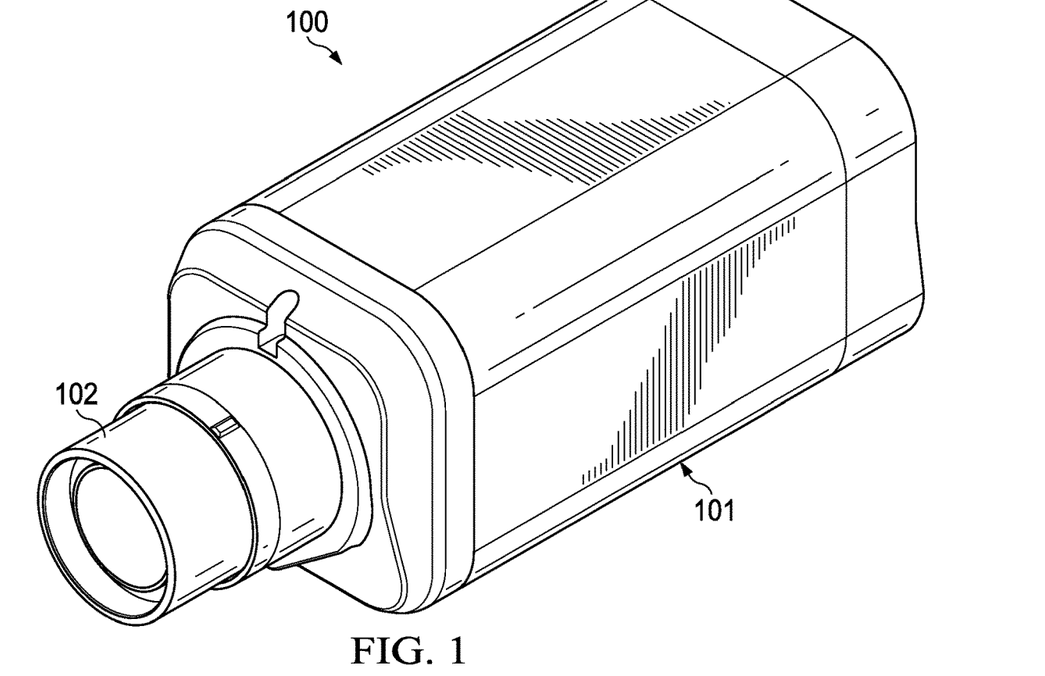
FIG. 1 illustrates a camera video recorder, in accordance with one embodiment.

FIG. 1 illustrates CVR 100, in accordance with one embodiment. CVR 100 has housing 101, which accommodates a digital video camera operatively mounted in the housing. Lens 102 of the digital camera can be seen in FIG. 1. A digital video recorder is also mounted, or otherwise disposed in housing 101, as is a network switch and at least one processor and related circuitry. Housing 101 may, in accordance with various implementations, be an aluminum case, which makes use of, and/or provides, convection cooling for the components housed therein.

Figure 2:
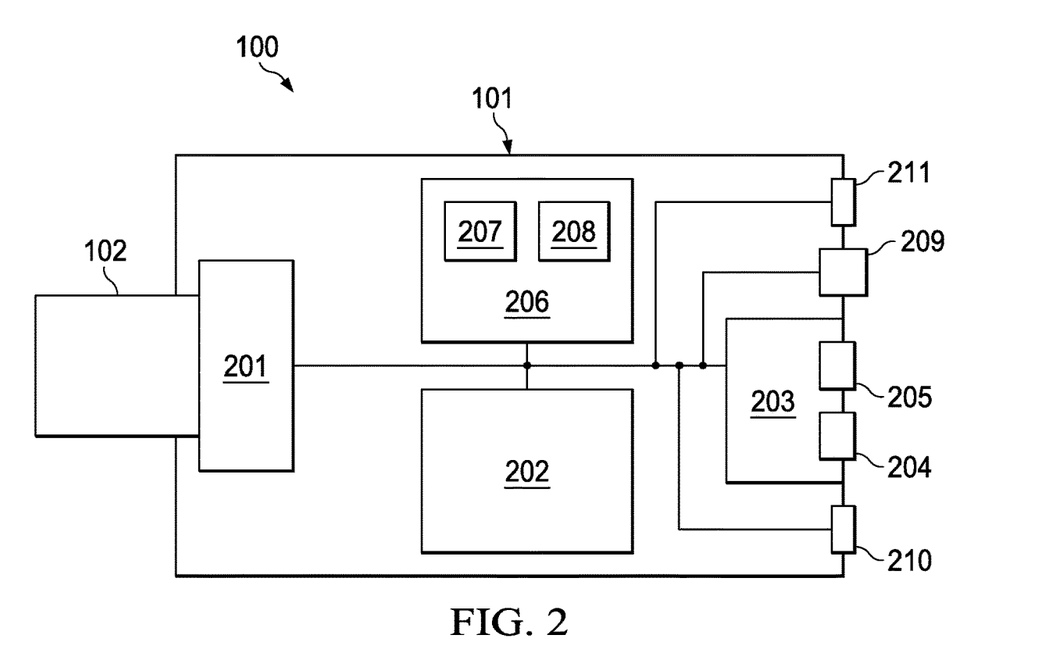
FIG. 2 is a block diagram of an example camera video recorder, according to one embodiment.

FIG. 2 is a block diagram of an example of CVR 100, according to one embodiment. CVR 100, such as may be housed in housing 101 of FIG. 1 may include digital video camera 201, which may be operatively mounted in housing 101, and which has lens 102. In various embodiments, camera 201 is a high-sensitivity imager, which has a wide dynamic range (i.e. at least 120 dB) and low light capability (e.g. 0.1 lux minimum in color and 0.001 lux in black and white (grayscale) operation). As noted, digital video camera 201 may, in certain embodiments, be a high-sensitivity IP camera, or the like, and in particular embodiments may employ an analog-to-digital converter within each pixel of the image sensor. Digital video camera 201 may output both digital and analog video, at various (user selectable) video resolutions, such as, by way of example, QVGA (320×240), VGA (640×480), and/or D1 (720×480), and may simultaneously output (user selectable) NTSC or PAL analog video signals.

Digital video recorder 202 is disposed in housing 101 and is coupled to digital video camera 201 to record images (still images or video) provided by digital video camera 201. Digital video recorder 202 may be implemented in hardware and/or in software and/or firmware. Digital video recorder 202 may employ any number of (user selectable) recording speeds at various resolutions, such as, by way of example, 30 (Frames Per Second) FPS at 320×240 resolution, 15 FPS at 640×480, and/or 7.5 FPS at 720×480, in various recording formats, such as, by way of example, JPEG, MPEG, H.264

Network switch 203 may also be mounted or otherwise disposed in housing 101 and provides at least one network connection, such as illustrated ports 204 and/or 205. Network ports 204 and/or 205 may be Ethernet ports or the like, but the network connection provided may be any appropriate, wired or wireless, networking connection. In particular embodiments network ports 204 and/or 205 may be ATM adapted ports. In various embodiments, the network connection(s), such as the illustrated pair of network ports 204 and 205 may provide pass-through communication, such as for linking a number of CVRs 100 and/or to allow access to any individual one of such linked CVRs 100. Additionally, port 204 and/or port 205 may provide monitoring capabilities. One or more CVR 100 may be powered using Power over Ethernet (PoE), via one of port 204 or 205. In some embodiments, CVR 100 may use power from local electrical circuits (such as via an AC-to-DC transformer, battery power, or the like). Ports 204 and 205 provide auto-negotiation in various embodiments. Hence, a crossover cable is not necessarily required for direct connection to other equipment.

Controller 206, which includes at least one processor 207, such as one or more digital media processors, which may be adapted to run an operating system (such as an embedded Linux-based operating system, or the like), and control digital video camera 201, digital video recorder 202 and network switch 203. In this manner, as noted, digital video recorder 202 may be implemented in hardware and/or in software and/or firmware, in controller 206, by processor 207. Processor 207 may run the operating system, control digital video camera 201, digital video recorder 202 and network switch 203, to provide an Internet protocol-based interface, such as an HTML interface (e.g. a webpage), and/or the like. In accordance with various embodiments, processor 207 may additionally, or alternatively, run the operating system and control digital video camera 201, digital video recorder 202 and/or network switch 203 to provide analytics, recognition of meaningful patterns in data. Such analytics may include, but are not limited to, recognition of an individual, recognition of an object, a count of people or objects, or the like. Similarly, the use of "through the camera lens" environmental light monitoring, whereby CVR 100 may create an alert when the level of light drops to a level that may create a security risk at the CVR's location. Controller 206 and/or processor 207 may include internal memory or other processor-readable medium 208. This memory or other processor-readable medium include be electronic circuitry, semiconductor memory device(s), flash memory, ROM, erasable programmable ROM (EPROM), etc.

Embodiments of CVR 100 may also include coaxial video output 209, such as a BNC (Bayonet Neill-Concelman) connector, which may extend from camera housing 101 to provide analog video output from CVR 100. In such embodiments, BNC connector 209 outputs an analog video signal (i.e. a (user selectable) NTSC or PAL video output), which may be used to ease initial installation adjustments, and/or to output to a "spot monitor," or the like. CVR 100 might further include input-output interface 210, which may be a universal serial bus (USB) port or the like. Memory card interface 210 is operative to communicate with digital video recorder 202 for storing and/or transferring digital video, on a memory card, such as secure digital memory card, or the like, in various embodiments, and which in particular embodiments may be a micro-SDXC memory card (Class 10). Such a memory card may function as the sole source of image or video storage memory for digital video recorder 202, or as a supplementary source, such as may be used for aforementioned video transfers. In various implementations, images may only be recorded during specified recording times as defined in a recording schedule. The format of these images may be based on settings specified in an image compression page. Recording length may be specified by the recording schedule. During recording, image files may be sent to, internal memory (e.g. of digital video recorder 202, if the CVR is so equipped), the memory card and/or an FTP site. The file format used for any destination is the same, as determined by the setting in the image compression page.

Figure 3:
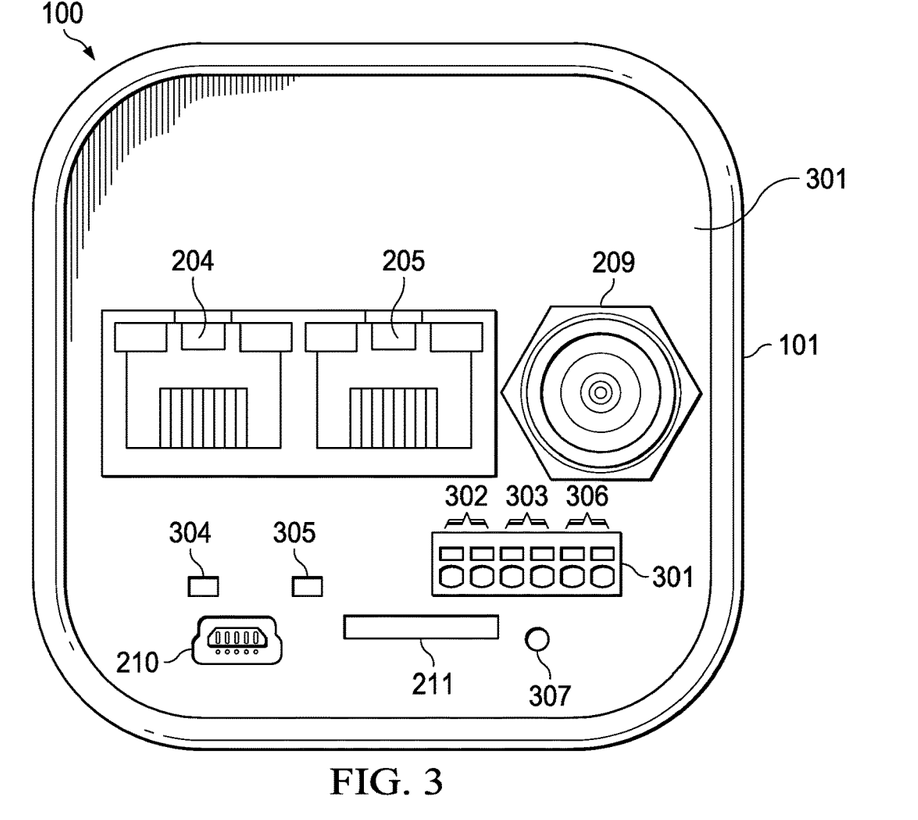
FIG. 3 illustrates the rear panel of the camera video recorder, according to one embodiment.

FIG. 3 illustrates rear panel 301 of CVR 100, according to one embodiment. As noted, Ethernet and/or ATM ports 204 and/or 205 allow CVR 100 to connect to other devices, such as other CVRs, network servers, user terminals, etc. BNC connector 209 provides an additional means for video output for CVR 100, such as for linking video output from CVR 100 to a more traditional surveillance system, monitor, or the like. Also, as noted above, memory card interface 210 is operative to store and/or transfer digital video on a memory card, such as secure digital memory card, or the like. Input-output interface connector 211, which, as illustrated, may be a micro-USB connection port, or the like, may be used for alarm input/output, image and video transfer, configuration upload/download, and/or power, as noted.

Further, alarm input 302, which may accept two input leads from a normally closed or normally open alarm switch or relay, may be used by CVR 100 as an input for CVR 100 to take various programmable actions, as discussed in greater detail below. In accordance with various embodiments, alarm input may be received from one or more of a hold-up button, door contact, motion detector, access control, vibration sensor, or the like, referred to herein as an "alarm switch." When CVR 100 detects closure across the terminals of a normally open alarm switch, or opening of a normally closed alarm switch, an alarm will be logged by CVR 100. The CVR system monitors the alarm input terminals for a contact closure/opening. In accordance with particular embodiments alarm input must have a contact closure/opening for a minimum amount of time, by way of example, for at least one second, for the CVR to recognize an alarm input. Various CVR embodiments may have the following event triggers, discussed in greater detail below, alarm input (such as via alarm input 302, motion detection (such as through camera 201, by controller/process 206/207), network down (such as detected by controller/processor 206/207, via network switch 203, and/or remote alarm message. Each of these events may be able to specify a unique notification to occur when the trigger is detected (i.e., record video, send email, etc.), as determined by the event trigger page, discussed below. Trigger events are continuously monitored in various embodiments, as long as the system is operational, but such monitoring may be modified based on the user established CVR schedule, as discussed below.

In accordance with embodiments of the present CVR, a trigger event occurs when a monitored event changes state.

Motion detection is determined in various embodiments on a frame-by-frame basis, such that constant motion in the video stream will result in a sequence of motion detection event triggers. When a trigger event occurs, it can cause the following to occur as defined by the various HTML page settings, discussed in greater detail below: record video (The number and/or length of images saved as defined in the time setting on specific event page); FTP notification (The image sent by FTP (for a trigger event) is a JPEG image. The number of images sent are per a definition in the FTP setting page); email notification (The image attached to an email is a JPEG image. The number of images sent is per a definition set in the Email Notification page); activate alarm out (The alarm output signal is active for five seconds on a first detection of the trigger event. If the trigger event continues to occur, the alarm output may stay active for five seconds after the last trigger event, or the like); and log event (A message will be logged for each occurrence of the trigger event.)

Alarm output 303 may provide an alarm signal output in response to programmed conditions to an audible or visual alarm, access controls lighting, or the like. Status LEDs include Power LED 304 and alarm LED 305. In accordance with various embodiments these LED's may both be bi-color and may be used to indicate the status of CVR 100. In such embodiments, when CVR 100 is successful in booting-up power LED 304 may be blue and alarm LED 305 may be off. During the start-up phase these LEDs may be used to indicate the successful completion or errors during various phases and will help in troubleshooting if there are issues. For example, during the start-up phase the power LED 304 may be purple (blue+red), with red indicating the system is initializing and blue indicating that the system is operational and OK. In particular embodiments, during start-up LEDs 304 and/or 305 may flash per the following table to show the current state of CVR 100 and/or boot-up issue.

| Power LED | Alarm LED | Boot Time | Most likely error or condition |
| --- | --- | --- | --- |
| Blue | None | Zero sec | If no other LEDs are visible after power cycle it may indicate a Processor failure. Defective unit |
| Blue + Red (Purple) | None | 0.9 sec | ROM Loader failed to find/load UBL (first stage boot loader) from NAND ROM |
| Blue + Red (Purple) | Red | One sec | UBL failed to find/load U-Boot (2nd stage boot loader) from NAND ROM. |
| Blue + Red (Purple) | Green + Red | Two sec | U-Boot failed to initialize network card. |
| Blue + Red (Purple) | Green | Five sec | Linux Kernel and OS initialization/update problem |

Polarized power input 306 may be used for providing eternal power to CVR 100, particularly when PoE is not used for the CVR unit. This input power may be, by way of example be 12 VDC at 1.5 Amps, but CVR 100 may accommodate a power input range of 10.5 V-13.5 V, in accordance with various embodiments.

Hardware factory reset button 307 may be depressed and held for a period of time, by way of example, more than five seconds, to reset CVR 100. Reset may be indicated by cycling of LED indicators 304 and 305, as described above. In addition a "software" factory reset function is described below, which may allow a user to perform a "hardware" reset remotely, such as through the aforementioned HTML interface. This may reset all users, passwords, and settings of the CVR to a "factory fresh" default configuration. A "soft reset" (i.e. a reboot) of CVR 100 may be carried-out by disconnecting power, such as by unplugging power from power input 306 or unplugging an Ethernet cable providing PoE, and plugging power back in to CVR 100. Such a restart will preserve all users, passwords, and settings established in CVR 100.

Figure 4:
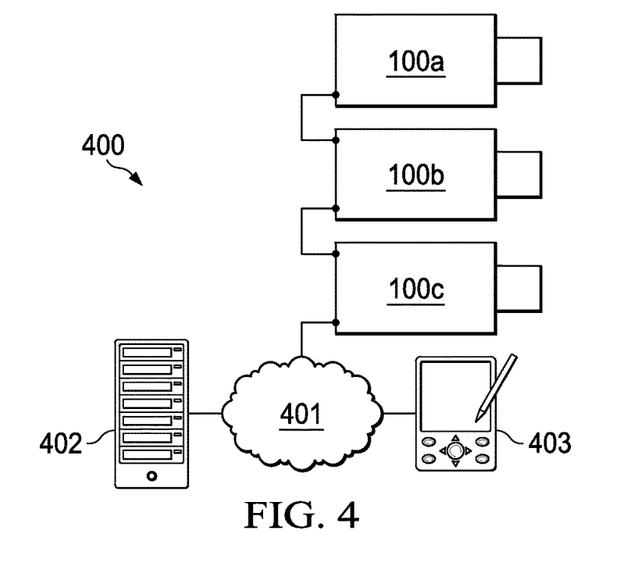
FIG. 4 illustrates a group of camera video recorders connected together in series and to a network, according to one embodiment.

FIG. 4 illustrates a group of CVRs connected together in series and to a network, according to one embodiment. FIG. 4 may be seen as illustrating surveillance system 400 of CVRs 100a-100c connected together in a "daisy-chain" manner. CVRs 100a-100c may be connected to each other in a digital packet network, such as through Ethernet ports 204 and 205 (FIGS. 2 and 3), using network cabling, such as by way of further example, Cat-5, Cat-5e, Cat-6 or Cat-6a cabling, or the like. In the illustrated example, CVR 100c may be coupled to a local network 401, such as an operator's Local Area Network (LAN), a wide area network, an intranet, the Internet, a cloud computing network, or the like, and/or may provide access to and from CVRs 100a-100c with a wider network, such as the Internet. CVRs 100a-100c may communicate together or individually with each other or other devices, such as a server 402 or user device 403, via network 401. Users may communicate with CVRs 100a-100c via network 401 to access images and video on any or all of CVRs 100a-100c and/or to provide configuration information to any or all of CVRs 100a-100c. CVRs 100a-100c may communicate together or individually with each other, or other devices, to provide alerts, analytics, or the like. For example, using "through the camera lens" environmental light monitoring one CVR 100a, 100b, or 100c may create an alert when the level of light drops to a level that may create a security risk at its location, and may communicate this change to other linked CVRs and/or notifications of such alerts may be sent over network 401 to an operator, such as in an email or directly to a network-connected mobile device. Network ports of CVRs 100a-100c may provide pass-through communication, such that communication between ones of CVRs 100a-100c and/or between one of CVRs 100a-100c and network 401 may pass-through an intermediate CVR. For example, communications between CVR 100a and 100c may pass-through CVR 100b, without further processing by CVR 100b. Likewise, communication between CVR 100a and network 401 may pass through CVRs 100b and 100c, without further processing. As noted, CVRs 100a-100c may be powered using PoE. In some embodiments, only a first one of CVRs 100a-100c, for example 100a, may use PoE and other ones of CVRs 100a-100c, for example 100b and 100c, in a chain may use power from local electrical circuits or battery power, such as via power input 306, discussed above.

Figure 5:
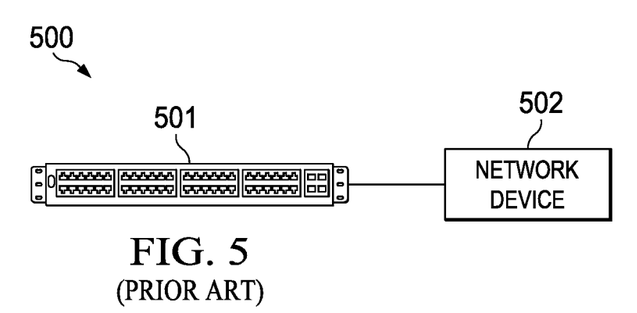
FIG. 5 illustrates a prior art network.
Figure 6:
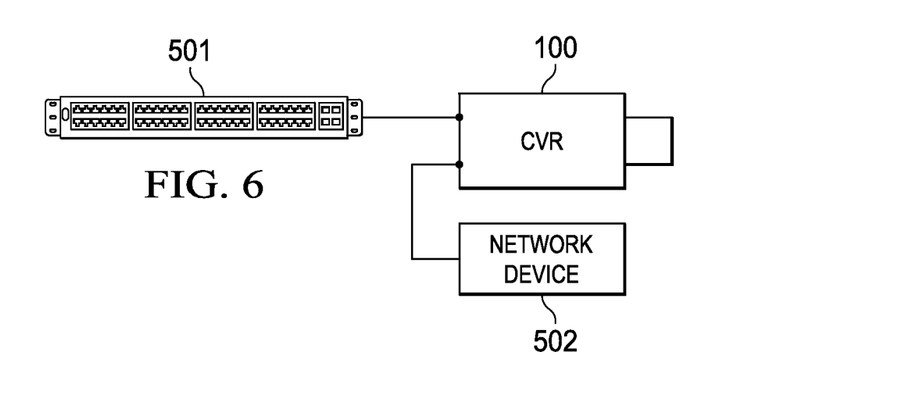
FIG. 6 illustrates addition of a camera video recorder to the prior art network of FIG. 5, according to one embodiment.

FIG. 5 illustrates a prior art network 500 that includes a network hub or switch 501 and at least one network device 502, such as a printer, an ATM, a multifunction device, a transaction system, or the like. FIG. 6 illustrates addition of CVR 100 to prior art network 500 of FIG. 5, according to one embodiment. CVR 100 may be connected between two existing network elements, such as between two network devices, or as illustrated, between a network device (502) and network hub or switch. This connection may be made using CVR Ethernet ports 204 and 205 (FIGS. 2 and 3) and network cabling, such as Cat-5, Cat-5e, Cat-6 or Cat-6a cabling, or the like. In the illustrated example, existing network 500 may be a Local Area Network (LAN), a wide area network, an intranet, the Internet, a cloud computing network, or the like, and/or may provide access to and from CVR 100 with a wider network, such as the Internet. Users may communicate with CVR 100 via network 500 to access images and video on CVR 100 and/or to configure CVR 100. CVR 100 may communicate with other network devices to provide alerts, analytics, or the like. Network ports of CVR 100 may provide pass-through communication, such that communication between other network devices is unhindered. CVR 100 may be powered using PoE and/or may use power from local electrical circuits or battery power, such as via power input 306, discussed above. Addition of CVR 100 to existing network 500, or the like, merely using a patch cord, in accordance with the embodiment of FIG. 6, dramatically reduces the cost of wiring to add a camera to an existing wired network.

As noted communication with a CVR, in accordance with various embodiments, employs an Internet protocol interface, such as an HTML webpage, or the like, via networking protocols such as IP, TCP, HTTP, RTCP, and/or FTP. To access a CVR, a user points a standard HTML browser to a Transmission Control Protocol/Internet protocol (TCP/IP) address assigned to the CVR the user wishes to access. In a webpage created by the target CVR, such as through the use of embedded software, which may be Linux-based, the user may view current video, review recorded video, view or review analytics provided by the CVR, download video or images from the CVR's digital video recorder, direct that images or video be transferred to a memory card in the CVR's memory card slot (or to the memory card in another networked CVR), set-up the CVR, or take similar action. In accordance with various embodiments, up to sixteen users may access a CVR via the HTML interface, at one time. However, access to the CVR may be controlled through the use of usernames and passwords. For example, tiered levels of access may be provided, such as administrator, operator and viewer-only. The HTML interface may also be used to upgrade CVR software and/or firmware, in accordance with various embodiments.

The HTML interface may provide any number of "webpages" for user interaction to provide the aforementioned viewing, reviewing, downloading, CVR setup, CVR configuration, and/or the like. In particular embodiments these webpages may include one or more pages for: Live View, Surveillance Images, Event Images, Settings (such as Date and Time), Image Set-up (including screens to set-up Compression, Motion Detection, On-Screen Display, Schedule, Surveillance, and/or the like), Event Inputs (including Alarm Input, Motion Detected, and/or similar screens), Network (including screens for set-up of FTP Server, SMTP Server, Email Notification, SNAP Server, TCP/IP, Port Settings, ATM Set-up, Status Manager, and the like), Update (such as for Firmware Update, Device Settings, and/or the like), and Status (including Activity Log, System Log, Memory Card, and/or the like).

A Live View screen may allow a user to watch a live video feed, and user options on this screen may include "Frame Save," "Frame Print" and/or the like, in various implementations. Video viewing (live and/or recorder) may be carried out using a browser plug-in, such as the VLC open-source media player browser plug-in.

On a Surveillance Images page, in various implementations, surveillance images may be retrieved by day and time. To facilitate such retrieval, days with video available may be highlighted in on a page-displayed calendar. User options on this screen may include image retrieval by calendar date, image retrieval by time (hours and minutes), viewed "video save" (such as to a connected computer or external memory device), and/or the like.

In various implementations an Event Images page may allow event images to be retrieved by day and time. Again, days with video available may be highlighted (in a contrasting color) on a page-displayed calendar. User options on this screen may include image retrieval by calendar date, image retrieval by time (hours and minutes), viewed "video save" (to a connected computer or external memory device), and/or the like.

Settings pages in various implementations may include a Date and Time page, wherein dropdown menus or the like may be used to set the current date and time. Additionally or alternatively, (optional) check box(es) or the like may be provided to let the CVR synchronize with either a connected computer (e.g. a network server) and/or a selected Simple Network Time Protocol (SNTP) server, or the like.

Image Set-up pages may include a Compression screen in various implementations, where a number of options allow the user to determine the quality of the recorded image. For example codec selections may include JPEG, H.264, and MPEG4, as discussed above, as well as a color system selections such as NTSC (U.S.A. standard), or PAL, as also discussed above. Image quality may also be selected on such a compression page. Selections might include Low, Normal, High, or the like. As one might appreciate a selection of Low requires the least amount of storage space, while High requires the most amount of storage space. Also, a Frame Rate (i.e. frames per second) selection might include options for 3, 6, 10, 15, or 30 fps.

An Image Set-up Motion Detection screen implementation might make use of a CVR's ability to ignore motion in selected "zones" within a viewed/recorded image, which in certain embodiments may be used to facilitate analytics. On such a page, a user may hover a cursor over a page-displayed image to display a (red) box(es) over a portion of the page-displayed image. These boxes may be used to select parts of the camera-detected image that will not trigger a motion recording. Thereby, these selected sections may be used, such as by controller/processor 206/207, to eliminate certain areas, such as, by way of example, a plant in front of a fan or HVAC vent from motion detection. When a box is selected the area will be omitted from motion detection and/or recording. To unselect a section, a user may only need to click the red box so it turns white and/or disappears, in certain embodiments. This Motion Detection page may also be used to set the sensitivity of the motion detection, such as to Low, Medium or High. In accordance with certain implementations, in order for the motion detection to be active, a schedule may need to be established, as discussed below.

An On-Screen Display screen under Image Set-up, in various implementations, may allow a user to add items to the Live View screen, viewed recordings, or the like, such as a Date Stamp (in a selected format) a Time Stamp (which may be selected to be in a 12 or 24 hour format), a Logo, Text (i.e., camera name, branch name), and/or the like.

In various implementations a Schedule screen under Image Set-up may enable users to choose what day(s) and/or time(s) they would like the CVR to record. Default settings may be all blank, or all active, in different implementations. A user may check a box next to a color block to select days or sets of days, such as one or more of Monday through Friday, Every day, Weekdays, Weekends (Saturday and Sunday). Then a user may select what time the recording will begin and the duration of the recording (for each of the selected days (or blocks of days)). Alternatively or additionally, the Schedule Screen may allow a user to select an end time for the recording, rather than a duration.

In various implementations a final Image set-up Surveillance screen allows users to choose where to save recorded video. For example, a user may select "Save Video to SD Card" (on-board storage) and/or "Upload Video via FTP" (images stored on a FTP Server). Both choices may be selected in some implementations.

An Event Inputs page in various implementations may lead to an Alarm Input screen that allows a user to choose what action the CVR should take when an alarm is received, which in certain embodiments may be used to facilitate analytics. An alarm may be detected via alarm input 302, discussed above, received via an incoming alarm message and/or generated as a result of a lost network connection. An "Activate Alarm Output" or similar selection may be available on the Alarm input screen to enable alarm reporting and other user selected activity. On an alarm the CVR may be set-up on this screen to save video to the memory card (such as for 10 seconds, 30 seconds, 1 minute, 5 minutes, 10 minutes, etc.), send an email, upload video via FTP, log the event, and/or report to a status manager. Also on this page an "Open" or "Closed" selection may indicate the active state for alarm contacts (i.e. select the active state for a (normally open or a normally closed) switch or relay connected to alarm input 302).

The Event Inputs page may also lead to a Motion Detected screen in various embodiments. This screen allows a user to choose what action should happen when motion is detected an alarm is received, and which in certain embodiments may be used to facilitate analytics. Again, an "Activate Alarm Output" or similar selection may be available to enable motion detection reporting and other user selected activity. Upon motion detection the CVR may be set-up on this screen to save video to the memory card (such as for 10 seconds, 30 seconds, 1 minute, 5 minutes, 10 minutes, etc.), send an email, upload video via FTP, log the event, and/or report to a status manager.

In various implementations a User Administration page allows the user to administer users and their assigned passwords. For example, a new user may be added by creating and entering a username and creating and entering a password, which may be confirmed in a typical manner, such as reentry of the password. On this screen an authority level may also be assigned to the new user. As noted, CVR users may be assigned one of a number of access levels. The access level may determine what a user can and cannot do on the CVR. For example and "admin" user may have full access and be able to change and set any parameter or setting on the CVR. An "operator" may have the same access as an admin, with the exception that an operator may not be able to add or delete users, or change user passwords other than their own. A "viewer" may only be able to access live and/or recorded video or images, and change their own password.

Network page implementations have a number of screens, such as an FTP Server screen where the CVR's ability to upload its images to an FTP Server is addressed. File Transfer Protocol (FTP) is a standard network protocol used to transfer files from one host device to another. In setting up FTP for a CVR in the FTP screen an "Account Name" is set to a user ID on the FTP server and a "Password" is set to the password on the FTP server for the FTP user ID. An "FTP Server" field is set to either the IP address of the FTP server or a hostname of the FTP server. An "FTP Port" may be left set to 21 (a default FTP port) unless a change is necessary. An "Event Upload Count" may be used to set a number of images or seconds (depending upon whether JPEG or MPEG is selected for the camera) that will be uploaded to the FTP site on each occurrence of an event input where the event input is set to upload video via FTP.

An SMTP Server screen implementation under the Network page may be used to set up the CVR to send emails. This screen provides means to enter an SSL/TLS for the connection, enter an Account Name and Password, identify the Sender, identify the user's SMTP Server, identify the SMTP Port, and of the like.

Implementations of the Network page may provide an Email Notification screen, which may be used to set-up the CVR to send email notifications to a specified Email Address, and to set-up the format and number of attached images. In accordance with various implementations a messages may be sent to a mobile phone on the occurrence of an event. Messages to mobile phones may be sent as either SMS messages (Short Message Service) (text only messages) or MMS messages (Multi-media Messages) (which may have picture attachment(s)). In accordance with such embodiments the message sent may include text describing the CVR location and the event action. For SMS or MMS messaging the email address on this screen will typically need to be set accordingly, typically as dictated by the mobile phone service provider.

As noted above an SNTP Server may be used to set system time and date. Implementations of the Network page provide an SNTP Server screen, where the CVR may be set-up to synchronize to a timeserver. There, the SNTP Server may be identified by Name (i.e. server.domain.local) or IP Address. A Time Zone may be selected for the CVR installation site and the CVR may be set to automatically adjust for daylight saving time changes. Time synchronization sources may include a network-based timeserver, a stand-alone time appliance, or other source available on the Internet, for example.

The Network page may provide a TCP/IP screen in certain implementations, where the CVR may be set-up with a TCP/IP address. On this screen a user may enable broadcast of the CVR's local IP address using mDNS (multi-cast DNS), such as may be used for Apple® iOS, using the Safari® browser. On this screen, a user may choose to enable dynamic IP address configuration without a DHCP server or enable standard DHCP operation (i.e. obtaining and IP address automatically). Alternatively, the user may manually input a Static IP Address, Subnet Mask, Default Gateway and DNS Address, on this screen.

A Port Settings screen under the Network page in various implementations may be used to program network ports of the CVR, such as Ethernet ports 204 and 205 discussed above. For example, this screen may afford various option selections for each of ports "Lan1" and "Lan2," separately, such as: "Down" (which permanently disables the selected LAN port); "Auto" (wherein, the selected port will auto-negotiate the fastest speed with the network switch); "100-Full" (where the selected port is set to 100 MBS, full-duplex); "100-Half" (where the selected port is set to 100 MBS, half-duplex); "10-Full" (where the selected port is set to 10 MBS, full-duplex); "10-Half" (where the selected port is set to 10 MBS, half-duplex); or the like. Further, selections offered on this screen may enable monitoring of input and/or output of each port.

In various implementations an ATM Set-up screen may be provided under the Network page. The CVR ports may pass-through data going to an ATM, to another CVR, or to another network device. On this screen an ATM's MAC address, IP address and/or Protocol may be set-up.

A Status Manager screen under various Network page implementations may be used to set-up CVR monitoring by status manager software, which in certain embodiments may facilitate the provision of analytics. In such implementations, Input Settings on this screen to allow the CVR to communicate with status manager software may include Account Name, Password, Status Manager IP Address, Status Manager Port (number) and/or similar settings.

An Update page may provide a Firmware update screen in various implementations. This screen may allow a user to view and/or verify the current software version on the CVR, perform a "one-button" software update, and properly Shutdown or Restart the CVR. This screen may also provide a means for a user to "Browse" to locate an update file and begin the update. During such an update, the CVR (such as through controller/processor 206/207) may verify the selected file is valid and that it is a newer version of the software than what is installed on the CVR. This screen may provide selections for CVR "Shutdown" and/or "Restart." Such a restart may be performed after a software update.

A Device Settings screen under the Update page in various implementations may allow a user to update CVR Device Settings, such as "Hostname," where a network name for this CVR may be input. A "Description" field may allow input of a descriptive name that appears in the browser and/or a browser tab. CVR settings may be backed-up to the CVR's memory card on this screen. This may be useful not only to back-up the device settings, such as for restoring the CVR after a "Factory Reset," but also for copying these device settings to another CVR. This screen may also provide a "Restore Settings from SD Card" selection, or the like, for copying system settings from a memory card into internal memory of the CVR, which may be used for restoring settings to the CVR and/or for transferring settings from another CVR to the present CVR. Another choice on the Device Settings screen may be an option to restore the CVR to factory default settings. This selection may reset all users, passwords, and settings of the CVR to a "factory fresh" default configuration. Alternative to this "software" factory reset function a user may perform a "hardware" reset using hardware reset button 307, or a power-off/power-on soft reset, as described above.

In accordance with various implementations a Status page may provide an Activity Log screen. The CVR may maintain a log of user activity. This may allow a user, with assigned permission, to review who has connected to the CVR, when, what they did, from what IP address they connected, and/or the like. Such entries may be listed by date and time and may be scrolled through.

Status page implementations may also provide a System Log screen. The CVR may also maintain a log of all System Activity. This screen may contain a detailed list of hardware activity, system activity, alarms with their cause, system errors, analytic determinations, analytic outputs, analytic actions, and/or the like. Such information may be useful in troubleshooting the system, or any connected devices. System Log entries may be listed by Date and Time and may be scrolled through.

The Status page may also include a Memory Card screen in various implementations. This screen may present information about the memory card installed in the CVR. Specific information available may include "SD Card Status" (which may show the card as "Operational" or otherwise)"SD Card Capacity," "SD Card Usage" (i.e. percent full, or the like) "Storage Disk Format" (to format the memory card (erasing stored data)), Storage Disk Unmount (which may be selected prior to removing the memory card from the CVR, and/or the like.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable programmable ROM (EPROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:
1. A surveillance system comprising:
a plurality of camera video recorders, each camera video recorder comprising:
a camera housing;
a digital video camera operatively mounted in the housing;
a digital video recorder disposed in the housing, coupled to the digital video camera and recording images provided by the digital video camera;
a packet networking switch disposed in the housing and providing a plurality of packet network connections; and
a processor disposed in the housing and adapted to run an operating system, to control the digital video camera, digital video recorder and packet networking switch to provide an internet protocol-based interface, and receive, via the interface, instructions to copy camera video recorder settings to at least one other of the plurality of camera video recorders; and
packet network links physically linking each camera video recorder directly to another camera video recorder in series via the packet network connections, linking at least one of the camera video recorders to a packet network via one of the packet network connections, and sending the camera video recorder settings to the at least one other camera video recorder, in response to receiving, via the interface, instructions to copy the camera video recorder settings to the at least one other camera video recorder.

2. The surveillance system of claim 1, wherein at least one of the camera video recorders further comprises
an alarm input configured to accept two input leads from a normally closed or normally open alarm switch or relay and to signal the processor to take various programmable actions in response to opening or closing of the respective normally closed or normally open alarm switch or relay.

3. The surveillance system of claim 2, wherein the processor:
controls the digital video camera, digital video recorder and packet networking switch to provide analytics; and
accepts instructions from a user to choose what action the camera video recorder should take when an alarm is received via the alarm input, to facilitate the analytics.

4. The camera video recorder of claim 2, wherein at least one of the digital video recorders further comprises a memory card operatively disposed in a memory card interface.

5. The surveillance system of claim 1, wherein the plurality of packet network connections is a plurality of switched packet network ports.

6. The surveillance system of claim 5, wherein the plurality of switched packet network ports selectively provide pass-through communication.

7. The surveillance system of claim 1, wherein the digital video camera comprises an internet protocol camera.

8. The surveillance system of claim 1, wherein the digital video camera provides through the camera lens environmental light monitoring.

9. The surveillance system of claim 1, wherein at least one of the camera video recorders further comprises an input-output interface.

10. The surveillance system of claim 1, wherein at least one of the camera video recorders further comprises a memory card interface in operative communication with the digital video recorder for storing or transferring digital video.

11. The surveillance system of claim 1, wherein the processor of at least one of the camera video recorders provide motion detection using the digital video camera and accepts selection of parts of a camera-detected image that will not trigger a motion detection event trigger.

12. The surveillance system of claim 1, wherein the processor provides the internet protocol-based interface, via said packet networking switch.

13. The surveillance system of claim 1, wherein the internet protocol-based interface provides an interface to control operation of the camera video recorder.

14. The surveillance system of claim 1, wherein the internet protocol-based interface provides an interface to download images from the digital video recorder.

15. The surveillance system of claim 1, wherein the internet protocol-based interface provides an interface to setup the camera video recorder.

16. The surveillance system of claim 1,
wherein the packet network links physically link at least one camera video recorder between two existing network elements via the packet network connections.

17. The surveillance system of claim 16, further comprising the packet networking switch providing pass-through communication between the existing network elements.

18. The surveillance system of claim 1, wherein the plurality of packet network connections are switched packet network ports that selectively provide switched or pass-through communication between camera video recorders or between one or more of the of camera video recorders and the packet network.

19. The surveillance system of claim 1, wherein each processor also runs the operating system and controls the digital video camera, digital video recorder and packet networking switch to provide analytics.

20. The surveillance system of claim 1, wherein at least one of the camera video recorders further comprises
an alarm output and an analog output for output of analog video, and the processor is further adapted to provide an alarm output signal, via the alarm output, for a preconfigured amount of time, upon detection of a trigger event by the processor, via the digital video camera.

* * * * *

UNITED STATES PATENT AND TRADEMARK OFFICE
CERTIFICATE OF CORRECTION

PATENT NO. : 10,652,503 B2
APPLICATION NO. : 14/249923
DATED : May 12, 2020
INVENTOR(S) : Dozier Page 1 of 1

It is certified that error appears in the above-identified patent and that said Letters Patent is hereby corrected as shown below:

In the Claims

In Column 16, Line 26, Claim 18, delete "of the of" and insert -- of the --.

Signed and Sealed this
Sixteenth Day of June, 2020

Andrei Iancu
*Director of the United States Patent and Trademark Office*